United States Patent [19]

Walker et al.

[11] Patent Number: 6,020,056
[45] Date of Patent: Feb. 1, 2000

[54] POLYETHYLENE TEREPHTHALATE FILM FOR ELECTRICAL INSULATION

[75] Inventors: Charles C. Walker; Rameshchadra M. Gohil, both of Circleville, Ohio

[73] Assignee: E. I. du Pont de Nemours and Company, Wilmington, Del.

[21] Appl. No.: 08/956,228

[22] Filed: Oct. 22, 1997

Related U.S. Application Data

[63] Continuation of application No. 08/733,861, Oct. 18, 1996, abandoned, which is a continuation-in-part of application No. 08/425,950, Apr. 19, 1995, abandoned.

[51] Int. Cl.⁷ .............................. C08G 63/00; H02K 1/04
[52] U.S. Cl. ..................... 428/323; 428/480; 428/910; 528/308; 528/308.1; 528/308.6; 493/949; 174/137 R; 310/43
[58] Field of Search ..................... 428/323, 480, 428/694 ST, 910, 694 SL; 528/308, 308.1, 308.6; 493/949; 174/137 R; 310/43

[56] References Cited

U.S. PATENT DOCUMENTS

| | | | |
|---|---|---|---|
| 3,964,945 | 6/1976 | Everhart et al. | 156/52 |
| 3,984,379 | 10/1976 | Oka et al. | 528/274 |
| 4,274,025 | 6/1981 | Nerurkar et al. | 310/215 |
| 5,087,526 | 2/1992 | Tomitaka et al. | 428/480 |
| 5,182,359 | 1/1993 | Kanaka et al. | 528/193 |

*Primary Examiner*—D. S. Nakarani
*Assistant Examiner*—Ramsey Zacharia

[57] ABSTRACT

A polyethylene terephthalate film suited for motor insulation is described having the following:

(a) an intrinsic viscosity of 0.80;
(b) a lateral crystalline size of not greater than 65 Angstroms;
(c) an extractable oligomer content of no more than 0.6% by wt.;
(d) a hydrolytic lifetime of at least 500 hours;
(e) a density within the range from 1.385 to 1.395;
(f) no more than 3% by weight comonomer;
(g) no more then 1.5% by weight of diethylene glycol as a comonomer;
(h) a carboxyl content of no more than 25 milliequivalents per gram of polymer;
(i) a particulate content of 0.1 to 2 weight % with the proviso that the polyethylene terephthalate film does not contain an end capping agent; and
(j) an embrittlement time at 160° C. of more than 100 days.

2 Claims, No Drawings

POLYETHYLENE TEREPHTHALATE FILM FOR ELECTRICAL INSULATION

CROSS REFERENCE TO RELATED APPLICATIONS

The present patent application is a continuation of application Ser. No. 08/733,861 Oct. 18, 1996, now abandoned, which is a continuation-in-part of patent application Ser. No. 08/425,950, Apr. 19, 1995, now abandoned.

BACKGROUND OF THE INVENTION

The present invention is directed towards biaxially-oriented films of polyethylene terephthalate containing no more than 3 wt. % of comonomer having superior hydrolytic and thermal stability. Film compositions of the present invention provide extended service lifetime when used as insulation in electrical motors.

Transition from traditional chlorofluorocarbon refrigerants to new, non-ozone depleting alternatives has placed new performance demands on the materials and components traditionally used in refrigeration systems. The reliability of electric motors used in hermetic environments is especially critical. The motor assembly utilizes polyethylene terephthalate film as slot liners, wedges, and interphase insulation which must function while immersed in refrigerant fluid and lubricating oil. Film insulation used in compressor motors must withstand this closed environment for years without loss of physical or electrical properties. Elevated temperature inside the sealed compressor promotes hydrolysis and enhances film embrittlement.

Harrington and Ward (ASHRAE Journal, pgs. 75 to 78, April 1959) have shown that the time to brittleness is correlated to the film exposure temperature and the partial pressure of moisture in the hermetic environment. McMahon et al. (Journal of Chemical Engineering Data, Vol. 4 (1), pgs. 57 to 78, January 1959) have shown that polyethylene terephthalate film is no longer functional as a reliable electrical insulator when the intrinsic viscosity (a measure of molecular weight) has decreased to a level of about 0.30 to 0.33 at which time the film has embrittled and cannot be folded upon itself without cracking.

Those skilled in the art recognize that selection of polymer composition and processing conditions during biaxial orientation and heatsetting establish the structure and, therefore, the properties of oriented polyethylene terephthalate films. Gohil in the *Journal of Applied Polymer Science*, Vol. 52, pgs. 925 to 944 (1994) discloses broad relationships between structure and properties of polyethylene terephthalate films of conventional molecular weight having an intrinsic viscosity of about 0.55. Gohil proposes a model which relates microstructural reorganization within the film during heat treatment in the temperature range of 100° C. to 240° C. to transitional changes in film properties.

U.S. Pat. No. 3,432,591 to Heffelfinger discloses a biaxially-oriented polyethylene terephthalate film having an intrinsic viscosity greater than 0.82 and specific orientation of the (100) crystal plane relative to the plane of the film for use as electrical insulation. Heffelfinger teaches a preferred film density range of 1.37 to 1.40 g/cc obtained by selecting processing conditions for stretching and heat-setting of the film and the importance of film planarity, i.e., orientation of the (100) crystal plane which contains the benzene ring.

Although it is known in the prior art to introduce an end capping agent as an additive into polyethylene terephthalate film for the purpose of increasing hydrolytic stability, the use of such additive lies outside the scope of the present invention. An end capping agent (such as carbodiimide) reacts with the end groups of the polyethylene terephthalate to account for the stability increase. However, the disadvantage is that unreacted additive will migrate to the film surface or be extracted from the film over a prolonged time period.

In specific applications of the polyethylene terephthalate film such as in motor insulation such migration and/or extraction can be considered unacceptable in certain instances.

Therefore, a need exists for a polyethylene terephthalate film having prolonged hydrolytic stability which does not employ an end capping additive.

SUMMARY OF THE INVENTION

The invention is directed towards a self-supporting film suitable for use as an insulator in a motor assembly consisting essentially of a biaxially-oriented, heat-set film of polyethylene terephthalate having the following:

(a) an intrinsic viscosity of at least 0.80;
(b) a crystal size of not greater than 65 Angstroms;
(c) an extractable oligomer content of no more than 0.6% by weight;
(d) a hydrolytic lifetime of at least 500 hours;
(e) a density within the range from 1.385 to 1.395 gm/cc;
(f) no more than 3% by weight of comonomer;
(g) no more than 1.5% by weight of diethylene glycol as a comonomer;
(h) a carboxyl content of no more than 25 milliequivalents per gram of polymer; and
(i) a particulate content of 0.1 to 2 weight %, with the proviso that the polyethylene terephthalate does not contain an end capping agent.

Biaxially oriented films of the present invention utilize high molecular weight polyethylene terephthalate polymer compositions which rapidly crystallize to achieve and maintain a highly oriented structure in the amorphous regions between crystallites. These films are suitable for use as electrical film insulation having extended service life at elevated temperatures.

The polyethylene terephthalate film of the present invention is manufactured by a process having the following steps:

(a) solid state polymerizing pellets comprising polyethylene terephthalate and particulates for a sufficient time within the temperature range of 230° C. to 238° C. and below 1 mm Hg (absolute) to obtain an oligomer content of not greater than 0.3 wt. % and an intrinsic viscosity of at least 0.95 but no higher than 1.1;

(b) casting a substantially amorphous film by extrusion of pellets produced in step (a) through a die, said film having an extractable oligomer content of no more than 0.6 wt. % and an intrinsic viscosity of at least 0.8 but preferably not higher than 1.0;

(c) stretching the film at least 2.0 times its original dimension in the machine direction and the transverse directions, respectively, at a temperature within the range of 85° C. and 115° C. and at a stretching rate of at least 200% per minute;

(d) heatsetting the film at a temperature within the range of 190° C. and 230° C., preferably between 200° C. and 225° C.

DETAILED DESCRIPTION OF THE INVENTION

The present invention is directed to an improved polyethylene terephthalate film having an intrinsic viscosity of at least 0.8, but preferably not higher than 1.0; a lateral crystal size of not greater than 65 Angstroms; an extractable oligomer content of no more than 0.6% by weight; and a hydrolytic lifetime of greater than 500 hours.

Hydrolytic lifetime as defined herein is in accordance with the following test procedure: Polyethylene terephthalate film samples are placed in boiling distilled water and removed at three-day intervals for a total time period of up to 27 days. Intrinsic viscosity of each sample is determined in accordance with the technique described by Heffelfinger in U.S. Pat. No. 3,432,591. A plot of the intrinsic viscosity data as a function of time (in hours) gives a straight line or substantially straight line. The numerical value for hydrolytic lifetime is the time to reach an intrinsic viscosity of 0.35.

The hydrolytic stability of biaxially oriented polyethylene terephthalate films of the present invention is significantly improved over the prior art due to the selection of compositions employing high molecular weight (also expressed herein as intrinsic viscosity) polyethylene terephthalate and fine particulates which under suitable processing conditions form and retain an ordered structure in amorphous regions of the semicrystalline polyethylene terephthalate which are present between crystallites.

Since hydrolytic stability is an important criteria in films of the present invention, discussion is provided concerning the hydrolysis of polyethylene terephthalate films. Hydrolysis occurs in the amorphous phase of semicrystalline polyethylene terephthalate films. The amorphous phase is not of constant density, but can be varied dependent upon the time and temperature of the stretching and heat setting steps as well as any relaxation step used to impart dimensional stabilization.

Polyethylene terephthalate having an intrinsic viscosity of at least 0.8 exhibits increased numbers of polymer chain entanglements and reduced chain mobility due to the high molecular weight of the polymer chains. When polyethylene terephthalate compositions of the present invention are biaxially oriented, a highly ordered structure of aligned polymer chains is formed. With subsequent heatset within the temperature range of 190° C. to 230° C., preferably 200° C. to 225° C., such that about 50 volume percent of fine crystallites is produced, it is believed that the rapid formation of fine crystallites in polymer compositions of the present invention act as physical crosslink sites which maintain the highly ordered structure in the amorphous region surrounding the crystallites both as an extension of the structured interphase region where polymer chains extend outwards from opposing crystallite growth planes as well as due to ordered alignment of chains adjacent to crystal lamellae. Heat set at higher temperatures results in films with decreased hydrolytic lifetime.

Although not bound by theory, the formation of fine crystallites under heat set conditions prior to substantial relaxation of the aligned high molecular weight polyethylene terephthalate chains is believed to significantly increase the number of polymer molecules which bridge adjacent small crystallites compared to films formed from a conventional molecular weight polyethylene terephthalate resulting in retention of the ordered structure of the amorphous phase and a decreasing rate of crystallization. Restricted mobility of the high molecular weight aligned polymer chains between crystallites stabilize the ordered structure of the amorphous phase and retard the rate of crystallization induced embrittlement of films thermally aged below the heat set temperature. For a given polymer composition having an intrinsic viscosity greater than 0.8, the degree of structure in the amorphous regions become more ordered by increasing the number of crystallites and reducing their size at a given crystallinity.

While a highly oriented amorphous phase structure can also be formed during biaxial orientation of conventional molecular weight polyethylene terephthalate, this amorphous phase structure is readily relaxed under heat set conditions due to the higher mobility of the polymer chains such that crystallization is accompanied by crystallite growth through thickening of the lamellae as well as lateral growth due to chain bending at the crystal faces.

The polyethylene terephthalate resin of the present invention is at least 97 wt. % preferably 98.5 weight % polyethylene terephthalate. The amount of comonomer is limited to 3% by weight, preferably no more than 1.5% by weight and more preferably less than 1%, since comonomers tend to decrease the perfection of the crystallites and disrupt the structure of the amorphous regions of the semicrystalline polymer, thus decreasing the hydrolytic and thermal stability. Similarly, the carboxyl content of the polyethylene terephthalate resin should be no greater than 25 milliequivalents per gram of polymer, preferably less than 15 milliequivalents per gram of polymer.

As previously discussed in the Background Of The Invention, the practice of increasing hydrolytic stability by end capping of the polyethylene terephthalate polymer lies outside of the scope of the present invention. Therefore, use of an additive as an end capping agent such as carbodiimide lies outside of the scope of the present invention.

In the present disclosure, "end capping" means the chemical reaction of hydrophilic end groups on the polyethylene terephthalate with an end capping agent to form a functionality with reduced hydrophilicity. Phenyl isocyanate, for example, converts the hydroxyl end groups of polyester to urethanes and the carboxyl end groups to amides. Aziridines can be used in a similar manner. Polyfunctional end capping agents such as di-isocyanates and carbodiimides also have the ability to react with end groups on different polyester chains resulting in chain extension and/or chain branching.

While reaction of polyethylene terephthalate with a polyfunctional end capping agent can be used to increase the overall molecular weight of the polyester, the functional groups which are formed as a result of the chemical reaction between the polyester and the end capping agent are defects which cannot be incorporated into the crystallites and reduce the ability to obtain chain to chain alignment in the amorphous phase. Although stability of the unique polyester of the present invention may be increased through end capping, improved stability is present without such additive.

Film compositions which utilize an end capping agent can contain a residual (unreacted) portion which, over a prolonged time or at elevated temperature, can be extruded or exuded to the film surface where it may remain as a surface contaminant or volatilize. Alternatively, residual (unreacted) end capping agent can be extracted or leached from such films placed in contact with a liquid phase. Therefore, the film compositions of the present invention which achieve improved stability without use of an end capping agent are particularly suited for specific film applications such as motor insulation and other electrical end uses in which it is critical to select films that are not susceptible to migration or extraction of low molecular weight compounds under service conditions.

Polyethylene terephthalate compositions of the present invention contain fine particulates to enhance the rate of crystallization during subsequent heat treatment, to provide increased resistance to microcrack formation, and to roughen the film surface to facilitate film handling and winding. From 0.05 to 2 wt. %, preferably from 0.1 to 1 wt. %, of particulates having an average diameter of about 0.05 to 3.5 microns are typically added during synthesis of the polyethylene terephthalate. The particulates are typically inorganic particles including but not limited to titanium dioxide, silica, crystalline aluminosilicate (molecular sieve), and tricalcium phosphate. Additives which are not end capping agents as defined herein may be employed such as thermal stabilizers, antistats, coloring agents, and opacifiers as desired in so far as such additives do not degrade the hydrolytic lifetime of the biaxially oriented film to less than 500 hours.

Polyethylene terephthalate resin which is used as a starting material for manufacture of the polyethylene terephthalate film has an intrinsic viscosity of at least 0.80 and generally 0.82, preferably 0.95, but preferably no higher than 1.1. The polyethylene terephthalate resin is produced by solid state polymerizing pellets comprising polyethylene terephthalate made by conventional melt polymerization, such as the direct transesterification of dimethyl terephthalate and ethylene glycol followed by condensation polymerization under reduced pressure. It is preferred to continue the condensation polymerization reaction to an appropriate degree of polymerization at which time the polymer can be pelletized, crystallized, and then subsequently solid state polymerized to reach the desired intrinsic viscosity. A transesterification catalyst such as calcium, magnesium, zinc, or manganese is conventionally employed, preferably manganese. After the transesterification reaction, it is critical that a phosphorus-containing compound such as phosphoric acid, phosphorous acid, or a mono-, di-, or tri-ester of phosphoric acid (e.g., methyl acid phosphate) be added to deactivate the catalyst. The amount of phosphorus required to deactivate the catalyst satisfies the expression C/P=0.85 to 1.15, preferably C/P=1.0 where C is the mole number of the calcium, magnesium, zinc or manganese-containing component in the ester exchange catalyst and P is the mole number of the phosphorus-containing components. Excess phosphoric acid is undesirable since it causes agglomeration of fine particulates and elevates the level of diethylene glycol in the polyethylene terephthalate. Slurries of fine particulate are added subsequent to reaction of the phosphoric acid. A suitable catalyst for condensation polymerization, including but not limited to antimony trioxide and crystalline aluminosilicate (molecular sieve), may be added prior to or after the fine particulate.

As indicated, the condensation reaction is carried out under conditions of elevated temperature and reduced pressure to remove ethylene glycol and achieve an intrinsic viscosity and degree of polymerization sufficient to allow the polymer to be formed into pellets suitable for solid state polymerization to increase the molecular weight of the polyethylene terephthalate.

Subsequent solid state polymerization of the pellets can be either batch or continuous as is known in the art, i.e., crystallizing the pellets to avoid sticking and processing at temperatures above the glass transition temperature but below the melt point to facilitate further condensation of the polyethylene terephthalate. It is preferred that the solid phasing be conducted under process conditions of temperature and reduced pressure such that the intrinsic viscosity and reduced oligomer content of the pellets be achieved simultaneously in as short a time as practical. These pellets are polymerized within a temperature range of 230° C. to 238° C. and below 1 mm Hg (absolute) to obtain an extractable oligomer content of not greater than 0.3% by weight and an intrinsic viscosity in a range from 0.95 to 1.1. Excessive time at temperature can produce highly crystalline, high melting material which can impair the casting and stretching of thick film suitable for electrical insulation.

If small amounts of unmelted polyethylene terephthalate crystallites remain in the extruded film, these crystallites rapidly grow in the cast sheet as it cools from the melt resulting in a film which is difficult to stretch and prone to break. While it is possible to melt such nuclei by increasing the extrusion temperature and/or residence time, adjusting these process parameters is undesirable as they tend to decrease the molecular weight by thermolysis and increase the amount of oligomer.

It is difficult to quickly cool cast sheet of 100 to 125 mil thickness typical in the manufacture of film insulation and therefore a substantial portion of the film interior can be at a temperature of maximum crystallization (typically 150° C. to 170° C.) for an appreciable time. A substantially amorphous cast film as described in the present invention can be stretched without breaking due to embrittlement.

Condensation melt polymerization, taught by Heffelfinger U.S. Pat. No. 3,432,591 as an alternative route to high intrinsic viscosity, is not acceptable for the manufacture of films for use in high performance motor applications. Electrical insulation films for these applications require a low oligomer content to reduce the likelihood of oligomer extraction by refrigerants. Oligomer extraction from film insulation has been associated with a failure mechanism due to formation of precipitates which block circulation of refrigerants through fine capillaries.

The biaxially-oriented films of the present invention can be produced for example by subjecting sufficiently dried polyethylene terephthalate pellets to melt extrusion under controlled processing conditions including extruder temperature and residence time sufficient to maintain the oligomer content below 0.6% by weight. The as-cast film is rapidly cooled on a casting drum (preferably with airside cooling) to obtain a substantially amorphous film which is subsequently biaxially-oriented according to either a sequential or a simultaneous process (such as in the machine and transverse directions using a flat film line), followed by a heat-set step comprising annealing at a higher temperature to facilitate crystallization of the polymer film and formation of an extended oriented structure in the amorphous region between crystallites. An optional relaxation step may be added simultaneous or preferably subsequent to the heat set to enhance dimensional stability in so far as the relaxation step does not remove the preferred oriented structure in the amorphous phase between crystallites to an such an extent that the hydrolytic lifetime of the film is reduced to less than 500 hours.

Processing equipment with at least twice the stretching force of conventional equipment is typically used with the high molecular weight polymer of the present invention in order to assure stretching of the amorphous film at a rate of at least 200% per minute during in the orientation step. The film is stretched at least 2.0 times preferably 2.6 times, its original length in a machine and transverse direction. The orientation is within a temperature range of 85° C. and 115° C. The film is subsequently heatset in a temperature range of 190° C. to 230° C., preferably 200° C. to 225° C. It is desirable to operate at lower temperatures within the operating range for the orientation step as well as the heatset step since higher temperatures relax the structure of the amorphous region and thereby tend to reduce the overall hydrolytic stability of the resultant film.

The present invention teaches an improved polyethylene terephthalate film having a hydrolytic lifetime of greater than 500 hours. The hydrolytic and thermal stability of biaxially oriented polyethylene terephthalate films of the present invention is considered significantly improved over the prior art and in particular over commercially available films due to selection of high molecular weight polyethylene terephthalate compositions which under suitable processing conditions form and retain an oriented structure in the amorphous regions between crystallites.

Semicrystalline films of the present invention are formed by casting polyethylene terephthalate compositions comprising polyethylene terephthalate resin with an intrinsic viscosity of at least 0.8 but preferably not higher than 1.0 to form a substantially amorphous cast sheet, followed by biaxial orientation and heat set, preferably to a density between 1.385 gm/cc to 1.395 gm/cc to achieve both high dimensional stability and a ordered structure in the amorphous phase necessary to obtain enhanced hydrolytic lifetime. In a preferred mode, the carboxyl content of the biaxially oriented film is no more than 25 milliequivalents per gram of polymer and more preferably less than 15 milliequivalents per gram.

Films manufactured according to the present invention exhibit a broadening of the x-ray peak due to the structured amorphous phase which when measured as the width of the peak at half height corresponds to a lateral crystal size of less than 65 Angstroms according to a Scherrer equation as defined in subsequent discussion.

The crystal size in Angstroms as defined herein is calculated based on the width at half-height of the x-ray diffraction peak from the x-ray diffraction scan made using a parafocusing powder diffractomer as follows:

The film sample is placed in the diffractometer so that the normal to the surface of the film bisects the incident and diffracted beams. For reasonable resolution of the scan, the step-size in the region of the 100 reflection (near 26 degrees 2-theta) should be no larger than 0.05 degrees 2-theta. A background line for the 100 reflection is drawn from the point of inflection on the low-angle side such that it is tangent on the high-angle side. For a typical sample, this will be from about 23.5 to 29 degrees 2-theta. The width at half-maximum of the peak (HW) obtained by subtracting the background line. The crystal size (L) is calculated according a Scherrer equation expressed as:

$$L = \lambda / (\beta \cdot \cos(\theta)),$$

where L is lateral crystal size in Angstroms; lambda is wavelength of CuK-alpha radiation=1.5418 A; beta is width at half-maximum expressed in radians (=pi/180*HW= 0.01745*HW); theta=2-theta/2=~13.0 deg and cos(theta)= 0.975

Therefore:

$$L(\text{Angstroms}) = 1.5418/(0.01745 \cdot HW \cdot 0.975) = 90.6208/HW$$

The oligomer content of pellets or film was determined as the weight loss after solvent extraction for 24 hours in boiling xylene.

The chemical durability of the film was determined by hydrolysis. Film samples were placed in boiling distilled water and removed at three-day intervals for up to 27 days. The intrinsic viscosity in trichloroethane/phenol was obtained for the film samples as a function of exposure time according to the method taught by Heffelfinger in U.S. Pat. No. 3,432,591. A plot of intrinsic viscosity versus time in hours was found to give a straight line where the slope is the rate of hydrolysis and the intercept is the initial intrinsic viscosity. The numerical value of hydrolytic lifetime is the time to reach an intrinsic viscosity of 0.35.

Carboxyl content was determined by titration with sodium hydroxide after dissolution of the polymer in hot benzyl alcohol.

Isothermal crystallization was measured using a Perkin-Elmer DSC-7 with UNIX thermal analyzer over the temperature range of 110° C. to 230° C. Film samples were dried in a 160° C. oven for 34.5 hours and stored in a dessicator prior to testing. Five milligrams of film was heated to 290° C. at 50° C./min. and held at 290° C. to ensure full melting of the crystallites. The sample was then cooled to the desired crystallization temperature at a rate of 200° C./min. and held for 5 to 40 minutes until the crystallization was completed. The half-time was the time required to achieve 50% crystallization.

The time required to embrittle polyethylene terephthalate film was determined by oven aging at 160° C. Six strips about one inch by ten inches were placed in the oven for each sample. Samples were tested daily to determine the ability of the film to be folded 180 degrees back upon itself without cracking. Three samples were tested each in the MD direction and the TD direction. Failure was the minimum number of days in which the film cracked in either the MD or TD direction. Preferably, the films of the present invention resist embrittlement for more than 75 days.

In the following examples all parts and percentages are by weight and degrees in Centigrade unless otherwise indicated.

EXAMPLE 1

The following example illustrates the method of manufacture of polyethylene terephthalate films of the present invention.

Polyethylene terephthalate polymer was manufactured using a continuous process for direct transesterification of dimethyl terephthalate with ethylene glycol to provide a feedstock with an intrinsic viscosity of 0.50 to 0.55. The feedstock was formed into amorphous pellets which were crystallized and solid phase polymerized to an intrinsic viscosity of about 0.95.

Molten dimethyl terephthalate (DuPont, Old Hickory, Tenn.) at 160° C. was fed to the 17th tray of a continuous ester exchange column at a rate of 3,500 pounds per hour (18.04 pound moles per hour). Ethylene glycol (Union Carbide Corp.) was preheated to 150° C. and fed to the 19th tray of this ester exchange column. Manganese acetate tetrahydrate (Sheperd Chemical, Cincinnati, Ohio) was dissolved in ethylene glycol to give a 10% weight solution. The manganese acetate/glycol solution was fed to the 17th tray of the ester exchange column so that 100 ppm manganese, based on dimethyl terephthalate, was fed continuously to the column.

A polymerization catalyst was prepared by heating 1.0% weight of antimony trioxide (Laurel, Ultrafine) in ethylene glycol, with agitation, to 160° C. to 170° C. until dissolution was complete. This catalyst solution was fed to the 17th tray of the ester exchange column at a rate so as to provide 250 ppm antimony based on dimethyl terephthalate.

The total ethylene glycol feed rate, which includes catalyst solutions and virgin ethylene glycol, was 2237 pounds per hour (36.08 pound moles per hour). The ester exchange column has 21 trays of the bubble cap design. The calandria of the ester exchange column was a Dowthem® heated shell and tube heat exchanger which supplied heat for boil up and collected the monomer formed from the ester exchange reaction. Methanol was removed from the top of the ester exchange column by means of a partial condenser and monomer exited from the calandria. The temperature of the mixture in the calandria was maintained at about 240° C. The monomer, after being drawn from the calandria, was pumped through 100 micron wound fiberglass filters (PTI Technologies, Newburg Park, Calif.). After filtration, phosphoric acid (85% Ashland Chemical, Columbus, Ohio) dissolved in ethylene glycol (20% $H_3PO_4$ by weight) was injected at the center of the molten monomer stream in the monomer line. The amount of phosphoric acid was added to provide a 1/1 mole ratio of phosphorous/manganese. In this example, 100 ppm manganese required 1.82 moles of $H_3PO_4$, or 56 ppm phosphorus. The stream then flowed through a Kenics static mixer to facilitate rapid reaction of the phosphoric acid with Mn and to ensure that there is no unreacted acid at the point where the fine particulate is injected.

The monomer stream is then directed into the bottom of an up-flow prepolymerizer. The base of this prepolymerizer was at 290° C. and 200 mm Hg. The pressure and temperature at the top plate was 11 mm Hg and 292° C. Because of the pressure differential, molten monomer moved from the bottom to the top of this vessel. Separate glycol slurries of titanium dioxide and crystalline aluminosilicate, prepared as described below, were injected into the monomer stream just prior to the monomer stream entering the prepolymerizer to provide a concentration of about 1095 ppm titanium dioxide and 1535 ppm molecular sieve. As material moved up the column in the prepolymerizer, ethylene glycol was removed through a vapor line and condensed. The column contained 16 trays of the bubble cap design with liquid seal at the weirs on each tray. The movement of material up this column provided good mixing and dispersion of the added particulate. The prepolymer exiting the prepolymerizer had an intrinsic viscosity of about 0.2. This prepolymer then passed through a loop seal which isolated the prepolymerizer from the finishing vessel or finisher. The finisher is designed to remove the remaining ethylene glycol through a vapor line and brings the intrinsic viscosity of the polymer to the desired 0.50 to 0.55 level. The inlet of the finisher was maintained at 292° C. and the outlet was at 296° C.; the vacuum was maintained at 2.5 mm Hg. The finisher design is such that it generates a large surface area in the melt to facilitate diffusion of glycol by allowing rotating screen discs to dip into a polymer melt, allowing the melt to be distributed over the screen. Upon exiting the finisher, the polymer was pumped through a 20 micron polymer filter (Fluid Dynamics Corp., Deland, Fla.). The filtered polymer was extruded into ribbons, water quenched and then cut to length to form pellets. The dimensions of the pellet were 3/32 inch by 1/8 inch by 1/16 inch. These amorphous pellets were subsequently dried and solid state polymerized as described below.

The solid state polymerization process conditions impact three quality aspects of the processed polymer pellets: intrinsic viscosity, extractable oligomer content, and crystalline melting point.

The solid state polymerization process was carried out as follows: 14,000 pounds of amorphous pellets were charged into a jacketed tumbler which rotated at about 4 rpm. The pellets were heated to 135° C. over a 2.5 hour period with vacuum applied to provide 1 mm Hg. The pellets were rotated continuously for 2.5 hours at these conditions to further dry and crystallize them so as to avoid pellets sticking together at elevated temperatures. Over the next 2.5 hour period the temperature was raised to 234° C., and maintained at that point for 36.5 hours. At the initiation of the increase in temperature to 234° C., vacuum was increased to 0.5 mm Hg and maintained at that level for 36.5 hours. A periodic nitrogen gas sweep was maintained during the vacuum cycle. The pellets recovered from this solid state polymerization process had an intrinsic viscosity of 0.94 and an extractable oligomer content (24 hours boiling xylene) of 0.22%. Extending the time or increasing the temperature did not reduce the extractable level, or increase the viscosity significantly, but did generate measurable levels of a more highly crystalline, high melting specie. This is undesirable as it can compromise extrusion conditions and deteriorate key film properties. These solid state polymerized pellets were employed to prepare the film of this invention as follows.

Pellets which had been solid state polymerized as described above were dried in a rotating tumble drier at 160° C. for sufficient time as required to reduce the water content to 50 ppm or less prior to use. The pellets were maintained in this dried state while fed to a 83 mm Werner Pfleiderer extruder at a rate of 400 pph. Close control of extruder and downstream temperatures were required to maintain high molecular weight and low oligomer content. Temperatures in excess of 290° C. are to be avoided and residence time at elevated temperatures in the extruder should be less than ten to twelve minutes, preferably three or less, to prevent an undesirable increase in extractable oligomer content.

The extruder was divided into zones from back to front. Zones 1, 2, 3, 4, 5 and 6 melt temperatures were 152° C., 203° C., 194° C., 291° C., 277° C. and 272° C. respectively. The extruder screw was designed to move and melt high viscosity polyethylene terephthalate (viscosity of about 9000 poise at 285° C. and shear rate of 100 $sec^{-1}$) at low rpms (<40) without excessive mechanical heat generation. Upon exiting the extruder the melt was pumped (gear pump) through 20 micron polymer filters (Fluid Dynamics Corp., Deland, Fla.). The melt temperature in the filter body was maintained at 270° C. Upon exiting the filter the molten polymer was pumped through an end-fed die maintained at ≦290° C. The lip opening was set at 135 mils. The molten polymer was cast on a water-cooled drum with wire pinning and quenched to a substantially amorphous sheet. By control of quench drum speed and draw, the cast film was adjusted to the correct thickness (about 90 mil) to produce a stretched film 10 mil thick from a 3×3 stretch ratio. The cast film so produced was stretched in the machine and transverse directions in a continuous stretching device as described in U.S. Pat. Nos. 5,051,225 and 4,853,602. The stretch temperature was 96° C. Upon completion of the stretching process the film was heat set at 224° C. and relaxed slightly in the transverse direction (0.6" in an original width of 41.6"). The time in heat set was approximately 10 seconds and the stretch rate about 200% per minute.

Preparation of the fine particulate as an ethylene glycol slurry for injection during the manufacture of the polyethylene terephthalate feedstock is described below:

Crystalline aluminosilicate (molecular sieve):

Nine hundred pounds of Molecular Sieve type 9356 (13×) (manufactured by UOP) is added to 2100 pounds of ethylene glycol to form a slurry. The slurry is pumped through a type 16P open vessel vertical sandmill manufactured by Chicago Boiler. The grinding media is a 2.5 mm glass bead. The flow through the mill is two to three gallons per minute. After approximately ten hours the mill and pumps are stopped and a 5 micron polyethylene terephthalate bag filter is installed in an in-line filter housing. The flow to the mill is re-established and milling is re-started. Periodically, the milled product is sampled to measure percent solids and particle size distribution. Particle size distribution is measured on a Coulter Type TAII instrument using a 50 micron aperture. The required result is 50 to $90 \times 10^9$ particles per gram in channel 6 on this instrument. The milling is stopped when this result is achieved and the slurry diluted with ethylene glycol to give 10 wt. % solids. This slurry must be constantly agitated and recirculated through a 3M Type 525 A bag filter.

Titanium dioxide: Nine hundred pounds of TiPure R-960 titanium dioxide (DuPont) are added to a mixture of three hundred sixteen pounds of ethylene glycol and three pounds of potassium tripolyphosphate in a Hockmeyer mill processing tank. After agitation for thirty minutes, an additional 167 pounds of ethylene glycol is added and the mixing speed is increased to 1400 rpm and the slurry is stirred for six hours. The slurry is pumped through a sandmill to a slurry holding tank where additional ethylene glycol is added to reduce the concentration to 10 wt. % solids. The slurry must be constantly agitated.

The slurry of fine particulate is fed to the monomer stream as noted above.

Examples 2 through 4 and comparative example I are laboratory prepared film samples heat treated under full restraint to demonstrate the principles of the present invention. Films made by this laboratory process exhibit a higher degree of orientation in the amorphous region due to the higher level of planar film constraint which can be maintained during heat treatment compared to film webs manufactured using either pilot or commercial film manufacturing equipment.

Laboratory preparation of films was conducted by drying pellets for 4 hours at 160° C. to remove moisture and then melt pressing the dried pellets into 10 mil sheets. Semicrystalline film sheets were prepared in a laboratory stretcher by stretching 3x in the machine direction and 3x in the transverse direction at 85° C. and then heatsetting for 10 seconds at 200° C. under restraint.

EXAMPLE 2

Table 1 compares the hydrolytic life of as-cast (amorphous) and semicrystalline films of polyethylene terephthalate of varying molecular weight as indicated by intrinsic viscosity. Samples with an intrinsic viscosity higher than 0.8 were solid state polymerized to increase the intrinsic viscosity (molecular weight).

TABLE 1

EFFECT OF MOLECULAR WEIGHT ON HYDROLYTIC LIFE OF AMORPHOUS AND SEMI-CRYSTALLINE FILMS

| FILM STRUCTURE | INTRINSIC VISCOSITY | HYDROLYTIC LIFETIME |
| --- | --- | --- |
| Amorphous | 0.60 | 251 hours |
| Amorphous | 0.88 | 325 hours |
| Amorphous | 1.03 | 329 hours |
| Amorphous | 0.54 | 237 hours |
| Semicrystalline | 0.54 | 450 hours |

TABLE 1-continued

EFFECT OF MOLECULAR WEIGHT ON HYDROLYTIC LIFE OF AMORPHOUS AND SEMI-CRYSTALLINE FILMS

| FILM STRUCTURE | INTRINSIC VISCOSITY | HYDROLYTIC LIFETIME |
| --- | --- | --- |
| Amorphous | 0.94 | 393 hours |
| Semicrystalline | 0.94 | 871 hours |

The hydrolytic lifetime of amorphous film shows no dramatic enhancement due to increasing molecular weight. The hydrolytic lifetime of semicrystalline films is increased compared to the amorphous film since hydrolysis occurs only in the amorphous regions as shown for conventional polyethylene terephthalate (intrinsic viscosity=0.54). A significant and unexpected increase in hydrolytic lifetime is obtained for the biaxially oriented high molecular weight polyethylene terephthalate (intrinsic=0.94) according to the teachings of the present invention as compared to the improvement in hydrolytic lifetime obtained for conventional biaxially oriented polyethylene terephthalate film (intrinsic viscosity of 0.54) oriented under the same processing conditions.

COMPARATIVE EXAMPLE 1

Solid state polymerization is known to reduce the content of low molecular weight oligomers in the resin. The following experiment was undertaken to determine whether the hydrolytic lifetime of polyethylene terephthalate of conventional molecular weight could be increased by lowering the oligomer content.

Pellets of polyethylene terephthalate having a diethylene glycol content of 0.7% by weight with an intrinsic viscosity of 0.67 contained 5 ppm Fe, 77 ppm Mn, 36 ppm Na, 61 ppm P, 260 ppm Sb and 69 ppm Si as analyzed by ICP spectroscopy. Low oligomer content pellets were prepared by solvent extraction of 500 grams of the above pellets in a stirred kettle with 3 liters of boiling dichloromethane. Amorphous and semicrystalline films having 1.2% and 0.19% by weight oligomer content, respectively, were prepared and tested for hydrolytic lifetime as illustrated in Table 2. No effect of oligomer content on the hydrolytic lifetime of either amorphous or semicrystalline polyethylene terephthalate films was observed (i.e., within experimental error).

TABLE 2

EFFECT OF OLIGOMER CONTENT ON HYDROLYTIC LIFE

| FILM STRUCTURE | OLIGOMER CONTENT | DENSITY | HYDROLYTIC LIFETIME |
| --- | --- | --- | --- |
| Amorphous | Low | 1.336 | 272 hours |
| Amorphous | Standard | 1.336 | 264 hours |
| Semicrystalline | Low | 1.383 | 562 hours |
| Semicrystalline | Standard | 1.386 | 578 hours |

EXAMPLE 3

A high molecular weight polyethylene terephthalate composition containing 1.4 wt. % diethylene glycol comonomer and 2550 ppm titanium dioxide (average size=0.4 microns) and 600 ppm MIN-U-Sil 5P amorphous silica (US Silica Co, Berkley Springs, W.Va., average size=5 microns) was made according to the present invention The catalyst content was 100 ppm Mn, 265 ppm Sb, and 50 ppm P by ICP spectroscopy. Data for films were prepared using pellets with an intrinsic viscosity of 0.95 and stretched 3×MD and 3×TD at 95° C. with the stretch rate of 3775% /min. and heat-set at 200° C. are presented in Table 3.

TABLE 3

| POLYMER COMPOSITION | |
|---|---|
| Film | 3-1 |
| intrinsic viscosity | 0.82 dl/g |
| oligomer content | 0.5 wt. % |
| carboxyl content | 15 meq/g |
| density | 1.3936 |
| lateral crystal size | 57.5 Angstroms |
| hydrolytic life | 650 hours |
| hydrolytic rate constant | $-6.5 \times 10 - 4$ dl/g/hr |

COMPARATIVE EXAMPLE 2

The present invention is considered an improvement over U.S. Pat. No. 3,432,591 to Heffelfinger. Heffelfinger teaches use of either melt condensation polymerization or solid state polymerization of a melt polymerized polyethylene terephthalate as in U.S. Pat. No. 2,829,153 to obtain a high intrinsic viscosity polyethylene terephthalate.

Comparative Example 2 uses the catalyst system taught in U.S. Pat. No. 2,829,153 and is illustrative of the hydrolytic lifetime of a polyethylene terephthalate composition which does not use a phosphorus deactivant for the esterification catalyst and employs an internally precipitated additive rather than a fine particulate.

Polyethylene terephthalate polymer was melt polymerized from dimethyl terephthalate and ethylene glycol according to the method described in U.S. Pat. No. 3,452,591 employing about 40 ppm Zn+2 (as zinc acetate), about 60 ppm Li+ (as lithium hydride), and about 315 ppm Sb+3 (as antimony glycolate) based on the weight of the dimethyl terephthalate. The resultant polymer was cast, stretched and heat set at 235° C. to 240° C. to give a film with an intrinsic viscosity of 0.82, a density of 1.3954 g/cc, and a crystal size of 73.6 Angstroms. The rate of hydrolysis of this film placed in boiling distilled water was −23×10−4 dl/g/hr. The hydrolytic lifetime was 188 hours.

EXAMPLE 4

Polyethylene terephthalate polymer was prepared according to the present invention with and without fine particulate as described above (i.e., 1500 ppm titanium dioxide and 1250 ppm of crystalline aluminosilicate). The films were stretched 3 times in the machine and transverse directions either sequentially or simultaneously at varying rates and heat set at either 200° C. or 220° C. as indicated in Table 4. No significant effect was observed with orientation rate or for sequential versus simultaneous mode for orientation of the film. Incorporation of fine particulate was observed to significantly increase the hydrolytic lifetime.

TABLE 4

| Effect of Particulate on Hydrolytic Lifetime | | | | | | |
|---|---|---|---|---|---|---|
| Film | Fine Particulate | Rate | Mode | Temp °C. | Intrinsic Viscosity | Hydrolytic Lifetime |
| 4-1 | yes | 200% | SEQ | 200 | 0.87 | 869 hours |
| 4-2 | no | 200% | SEQ | 200 | 0.81 | 460 hours |

TABLE 4-continued

| Effect of Particulate on Hydrolytic Lifetime | | | | | | |
|---|---|---|---|---|---|---|
| Film | Fine Particulate | Rate | Mode | Temp °C. | Intrinsic Viscosity | Hydrolytic Lifetime |
| 4-3 | yes | 2000% | SEQ | 220 | 0.87 | 650 hours |
| 4-4 | no | 2000% | SEQ | 220 | 0.81 | 460 hours |
| 4-5 | yes | 2000% | SIM | 200 | 0.87 | 743 hours |
| 4-6 | no | 2000% | SIM | 200 | 0.81 | 460 hours |

COMPARATIVE EXAMPLE 3

High intrinsic viscosity polyethylene terephthalate is used commercially in the manufacture of blow molded bottles. The hydrolytic lifetime of films made from commercial polyethylene terephthalate made by reaction of terephthalic acid and ethylene glycol was tested as a function of varying heat set conditions.

CLEARTUF® 1006, a commercial polyethylene terephthalate resin supplied by the Polyester Division of Goodyear (now Shell Chemical Co, Apple Grove, W.Va.), had an intrinsic viscosity of 1.0 and DEG content of 1.3%. The resin was analyzed by ICP spectroscopy to contain 60 ppm phosphorus and 175 ppm antimony. Films were prepared by extrusion of pellets through a die using a twin screw extruder. The films were stretched 3 X by 3 X, and heatset at varying temperatures as indicated below. The films had an oligomer content of 0.6% with a carboxyl content of 33 meq per gm of polymer. Varying the heat-set temperature had no effect on the hydrolytic lifetime of films made using the CLEARTUF® resin formulation which contained no added inorganic particulates, as indicated in Table 5.

TABLE 5

| HYDROLYTIC LIFETIME OF CLEARTUF ® 1006 RESIN | | | | |
|---|---|---|---|---|
| SAMPLE | HEATSET TEMPERATURE | INTRINSIC VISC. | DENSITY | HYDROLYTIC LIFETIME |
| CT-1 | 216 | 0.82 | 1.3908 | 358 |
| CT-2 | 210 | 0.81 | 1.3888 | 357 |
| CT-3 | 205 | 0.81 | 1.3876 | 363 |
| CT-4 | 195 | 0.82 | 1.3851 | 367 |

Examples 5 and 6 were prepared from pellets prepared under conditions as in Example 1 having a polyethylene terephthalate composition containing 0.7 wt. % of diethylene glycol and 1500 ppm each of titanium dioxide and crystalline sodium aluminosilicate particulates at an intrinsic viscosity of about 0.90 after solid state polymerization. The catalyst content determined by ICP spectroscopy was 100 ppm manganese, 240 ppm antimony, and 60 ppm phosphorus.

EXAMPLE 5

The solid state polymerized pellets were extruded in a conventional manner, cast, biaxially stretched and then heat set at 220° C. to give a film of 0.83 intrinsic viscosity, an extractable oligomer content of 0.6 wt. %, a density of 1.3938 g/cc and a lateral crystal size of 63.7 Angstroms. This film was subjected to hydrolysis and reached a critical intrinsic viscosity of 0.35 in 575 hours. The rate constant of hydrolysis was found to be −8×10−4 dl/g/hr.

EXAMPLE 6

The same solid state polymerized polymer was used to prepare film as in Example 5 except the heat set temperature was lowered to 195° C. The resultant film had an intrinsic viscosity of 0.83, an extractable oligomer content of 0.6%, a density of 1.3876 gm/cc and a lateral crystal size of 49.3 Angstroms. The hydrolytic lifetime was 671 hours. The rate constant was $-7 \times 10-4$ dl/g/hr.

EXAMPLE 7

Ten mil thick commercially available polyethylene terephthalate films suitable for motor insulation were tested for hydrolytic stability compared to the films of the present invention.

TABLE 6

PROPERTIES OF COMMERCIAL MOTOR FILM INSULATION

| Sample | Density | Intrinsic Viscosity | Oligomer | Hydrolytic Lifetime | Size (Ang) |
|---|---|---|---|---|---|
| Film A | 1.4008 | 0.56 | 1.4% | 228 Hours | 72 |
| Film B | 1.3977 | 0.59 | 1.4% | 263 Hours | 71 |
| Film C | 1.3970 | 0.59 | 0.4% | 400 Hours | 67 |
| Film D | 1.3942 | 0.64 | 0.5% | 429 Hours | 70 |
| Film E | 1.3910 | 0.68 | 0.5% | 457 Hours | 69 |
| Example 5 | 1.3938 | 0.81 | 0.6% | 575 Hours | 64 |
| Example 6 | 1.3876 | 0.81 | 0.6% | 671 Hours | 49 |

EXAMPLE 8

The isothermal crystallization of the commercial motor film compositions in Example 7 and film of the present invention were measured in a Perkin-Elmer DSC-7 over the temperature range of 110° C. to 230° C. A five milligram sample was heated at 50° C./min. to 290° C., held for 5 minutes at 290° C., then quenched at a rate of 200° C./min. to the isothermal crystalline temperature where the sample was held for 5 to 40 minutes where crystallization was completed. All samples reached the half point for crystallization in one minute or less in the temperature range 150° C. to 180° C., the fastest rate being observed for all samples at around 170° C., as indicated in Table 7.

Crystallization behavior of the two high intrinsic viscosity polymer compositions tested are in sharp contrast. Example 5 of the present invention has one of the shortest time to reach 50% crystallization in the temperature range 200° C. to 220° C. while Comparative Example 2 has the longest time of samples tested.

Isothermal crystallization as a function of time was demonstrated at 210° C., a typical temperature used for heatsetting polyethylene terephthalate films and an Avrami plot log $(-1n\,(1-X_t)/X_{max})$ versus log time was made where $X_t$ is the amount crystallized at time t and $X_{max}$ is the total amount crystallized. Example 5 of the present invention showed a rapid rate of crystallization from the amorphous phase at low conversion (as indicated by the steepest slope at short time). A curvature of the Avrami curve for Example 5 was noted which indicated a significant decrease in crystallization rate with conversion observed after about 10% crystallization. This behavior was in sharp contrast with conventional linear Avrami plots observed with commercial motor films shown in Table 2 as well as Comparative Example 2, a high intrinsic viscosity polymer composition according to U.S. Pat. No. 3,432,591.

EXAMPLE 9

Thermally-induced crystallization is a primary cause for embrittlement of polyethylene terephthalate at temperatures between about 100° C. and 180° C. The time to embrittlement of commercially-available electrical insulation films was determined by oven aging at 160° C.

The lifetime of the film of the present invention is vastly superior to existing commercial films. Film of the present invention retains flexibility to a higher density than commercial films.

TABLE 8

HIGH TEMPERATURE EMBRITTLEMENT

| Sample | Days @ 160° C. | Density at Failure |
|---|---|---|
| Film A | 25 | 1.4074 |
| Film B | 26 | 1.4060 |
| Film C | 53 | 1.4071 |
| Film D | 58 | 1.4029 |
| Film E | 66 | 1.4049 |
| Example 5 | >137 | (1.4063 - not failed) |

What is claimed is:

1. An electrical motor containing an insulator of a biaxially oriented, heat set film of polyethylene terephthalate having the following:

(a) an intrinsic viscosity of at least 0.80;

TABLE 7

Crystallization Half Times as a Function of Temperature

| Crys. Temp. | Film A (min.) | Film B (min.) | Film C (min.) | Film D (min.) | Film E (min.) | Example 5 (min.) | Comp Ex 2 (min.) |
|---|---|---|---|---|---|---|---|
| 110° C. | — | 18.86 | — | 24.90 | — | — | 14.16 |
| 115° C. | 11.26 | 10.27 | 25.88 | 8.70 | 15.57 | 11.21 | 5.60 |
| 125° C. | 2.52 | 2.90 | 7.06 | 4.22 | 5.70 | 3.04 | 3.41 |
| 130° C. | 2.15 | 1.73 | 3.70 | 1.60 | 2.79 | 1.87 | 1.48 |
| 150° C. | 0.73 | 1.03 | 1.04 | 0.97 | 0.87 | 0.63 | 0.87 |
| 170° C. | 0.85 | 0.77 | 0.79 | 0.70 | 0.64 | 0.57 | 0.56 |
| 180° C. | 0.98 | 0.87 | 0.87 | 0.87 | 0.71 | 0.62 | 0.61 |
| 190° C. | 1.45 | 1.14 | 1.10 | 1.07 | 0.96 | 0.71 | 0.75 |
| 200° C. | 1.09 | 1.83 | 1.56 | 1.56 | 1.54 | 1.20 | 2.60 |
| 210° C. | 2.00 | 3.64 | 2.68 | 2.77 | 2.97 | 1.87 | 6.08 |
| 220° C. | 4.92 | 10.00 | 6.28 | 6.80 | 7.70 | 5.70 | 15.78 |
| 230° C. | 16.71 | — | 19.25 | — | 23.09 | 16.71 | — |

(b) a lateral crystallite size of not greater than 65 Angstrom;

(c) an extractable oligomer content of no more than 0.6% by weight in xylene;

(d) a hydrolytic lifetime of at least 500 hours;

(e) a density within the range from 1.385 to 1.395 gm/cc;

(f) no more than 3% by weight of comonomer;

(g) no more than 1.5% by weight of diethylene glycol as a comonomer;

(h) a carboxyl content of no more than 25 milliequivalents per gram of polymer;

(i) an inorganic particulate content of 0.1 to 2 weight % with the particulate having an average diameter of from 0.05 to 3.5 microns, with the proviso that the polyethylene terephthalate does not contain an end capping agent; and (j) an embrittlement time at 160° C. of more than 100 days.

2. The motor of claim 1 where the polyethylene terephthalate content is at least 98.5 weight %.

* * * * *